May 9, 1967
C. R. McCULLY 3,318,734
THERMALLY REGENERATIVE GALVANIC
CELL EMPLOYING THE FLUORIDES OF
ARSENIC, CERIUM AND URANIUM
Filed Sept. 27, 1962
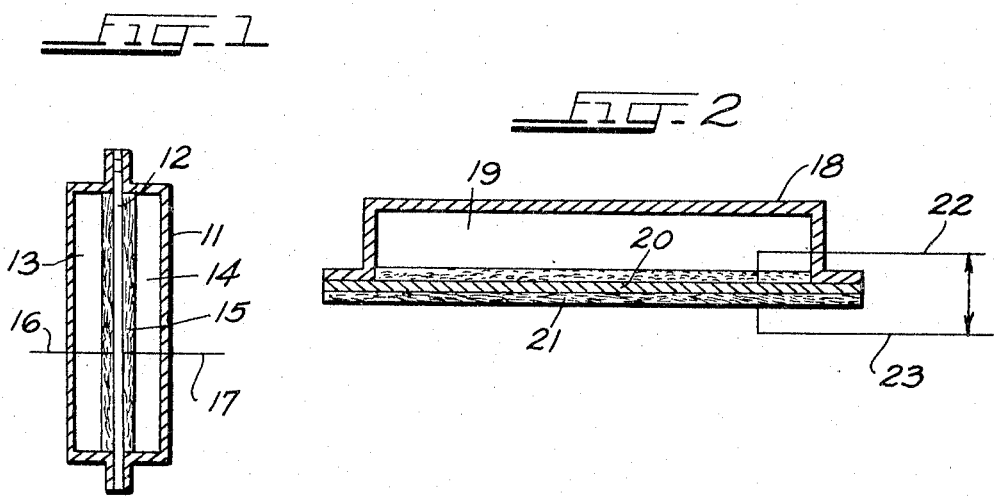
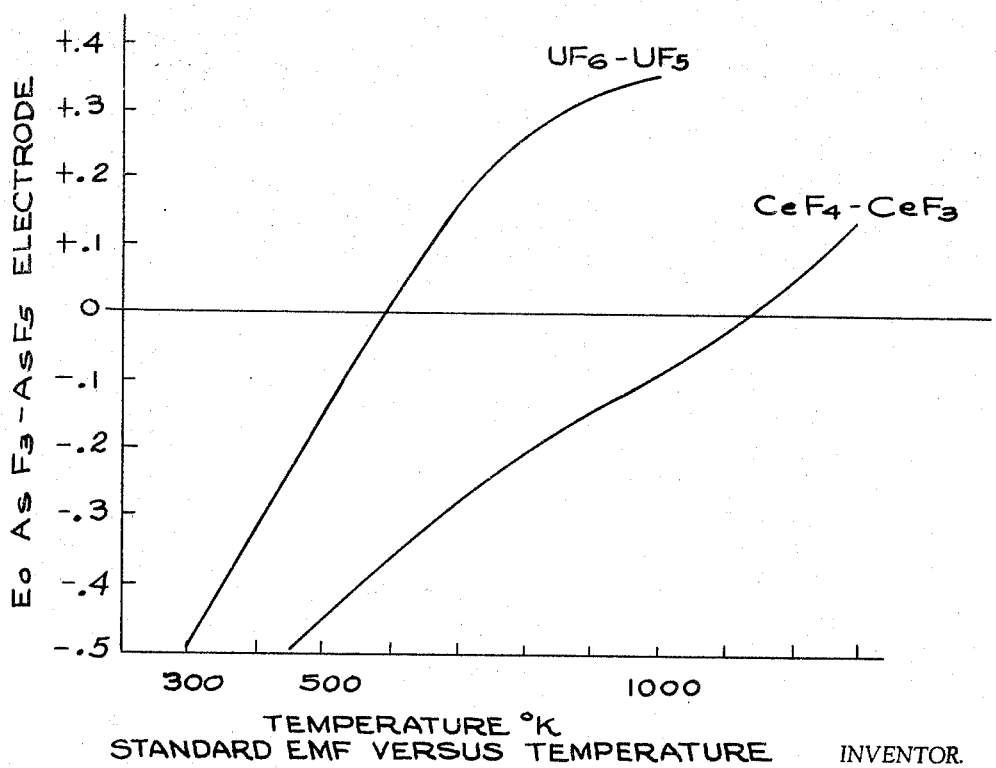
STANDARD EMF VERSUS TEMPERATURE
INVENTOR.
CHARLES R. McCULLY
BY Albert Siegel

United States Patent Office 3,318,734
Patented May 9, 1967

3,318,734
THERMALLY REGENERATIVE GALVANIC CELL EMPLOYING THE FLUORIDES OF ARSENIC, CERIUM AND URANIUM
Charles R. McCully, Prospect Heights, Ill., assignor to IIT Research Institute, a corporation of Illinois
Filed Sept. 27, 1962, Ser. No. 226,531
4 Claims. (Cl. 136—6)

The present invention relates to thermally regenerative galvanic cells and more particularly relates to such cells wherein arsenic trifluoride is employed as one electrode and either cerium fluoride or uranium fluoride is used as the other electrode.

Galvanic cells are well known and of course are quite old in the art. Such cells fall into several categories but generally speaking, are either discarded after use, as is the case with dry cells, or may be electrically regenerated as is the usual case with the so-called storage batteries or wet cells.

In recent years, a few thermally regenerative galvanic cells have been developed. Essentially, this refers to a type of cell which upon being spent, or more specifically discharged of its electrical potential, may be restored to its initial electrical state and thus recharged so to speak by the application of heat to the cell system. Such cells generate current in only one direction and insofar as electrical output is concerned do not generate current during the regenerative cycle thereof.

In distinction to the cells of the prior art, my invention is directed to an improved thermally regenerative galvanic cell which generates current in one direction at a relatively lower temperature and then has reversed polarity at a somewhat more elevated temperature. Such elevated temperature operation, while concurrently producing electrical current, regenerates the cell to its original electrochemical state thus providing a continuously operable cell.

Accordingly, a primary object of my invention is to provide a thermally regenerative cell which operates at one polarity at a relatively low temperature and at the opposite polarity at a relatively higher temperature, which latter operation regenerates the cell to its original electrochemical state.

A more specific object of my invention is to provide a thermally regenerative galvanic cell wherein one electrode is formed of arsenic trifluoride and the other electrode is formed of a material selected from the group uranium fluoride and cerium fluoride.

These and other objects, features and advantages of my inventoin will become apparent to those skilled in this art, particularly when considered in conjunction with the appended drawings in which:

FIGURE 1 schematically discloses one of the present cells;

FIGURE 2 schematically illustrates another embodiment of such cells; and

FIGURE 3 is a graph indicative of the electrical outputs of selected cells made as herein taught.

My invention in part is based upon the fact that the relative stability of the two arsenic fluorides, namely the pentafluoride $AsF_5$ and the trifluoride $AsF_3$, rapidly changes with increasing temperature. The trifluoride becomes more stable at about 1480° K. On the other hand, as to the other electrode materials useful in the present cells, namely $UF_6$, $UF_5$, $CeF_4$ and $CeF_3$, change very little with increasing temperature.

One cell system employs cerium pentafluoride, $CeF_4$, as the cathode member and arsenic trifluoride as the anode. At 300° K. the following reaction occurs:

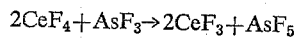

In this reaction, fluoride ion is transferred across the electrolyte from the $CeF_4$ to the $AsF_3$ while in the circuit external to the cell, electrons are being transferred in the opposite direction creating thereby a usable electric current. The reaction continues until substantially all of the trifluoride has been converted to pentafluoride. At this point the cell would be normally considered as spent.

However, a most interesting phenomenon occurs when such apparently spent cell has its temperature raised to about 1200° K. The arsenic pentafluoride and cerium trifluoride reaction products of the previous current generating cycle now function as cathode and anode respectively to generate current of opposite polarity to that of the 300° K. reaction and regenerate the original reaction products for a new 300° K. cycle. Thus, at the elevated temperature the following reaction occurs:

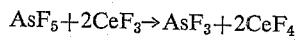

Again, fluoride ion is transported across the electrolyte while electrons flow in the external circuit. When this 1200° K. cycle is completed by the exhaustion of the reactants, one need merely cool the cell to approximately 300° K. and commence with the low temperature cycle all over again. Thus, the elevated temperature treatment of the cell constituents not only regenerates the lower temperature constituents but also at the same time likewise generates electrical current.

Another electrode material pair which functions with the arsenic fluorides is the penta- and hexafluorides of uranium. At 300° K. $UF_6$ acts as the cathode and $AsF_3$ as the anode to generate current in accord with the following formula:

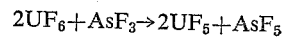

Again, fluoride ion is transported across the electrolyte from the $UF_6$ to the $AsF_3$ while electrons flow in the external circuit in the opposite direction.

At 1200° K. the polarity of the cell is reversed and the original constituents regenerated. Thus

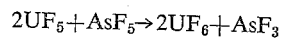

It is thus apparent that an inherent characteristic of the present galvanic cells is their polarity reversal upon sufficiently changing the environmental temperature at which they are operated. Furthermore, at none of the operating temperatures, viz, 300° to 1200° K., does spontaneous decomposition occur and thus it is never necessary to separate the reactants or reaction products.

I have found that the preferred electrolyte to employ in these cells is lead fluoride ($PbF_2$) an ionic solid, to which is added a small amount of potassium fluoride, KF, to improve the ionic conductivity thereof. It will be understood by those skilled in the art, of course, that other appropriate electrolytes may be similarly employed, their chief function being to serve as a fluoride ion transport path and a physical barrier between the anode and cathode constituents.

The cells are schematically illustrated in the two drawings. In FIG. 1, the container of the cell is denoted by the numeral 11. On the left hand side of the solid electrolyte 12, there is a chamber 13, which contains either arsenic trifluoride or arsenic pentafluoride. The material in this chamber acts as an anode for the cell at 300° K. and as a cathode for the cell at 1000° K. On the right hand side of the electrolyte 12, there is formed a chamber 14, into which is put either the uranium fluoride or cerium fluoride, as desired. Using the uranium system for example, such material as $UF_6$ acts as a cathode at 300° K. and as $UF_5$ acts as an anode at 1000° K.

One electrolyte that may be used as noted above is a solid form of lead difluoride with small amounts of potassium fluoride added thereto, the latter serving to enhance the ionic conductivity of the lead compound. Positioned on either surface of the solid electrolyte is a porous conductor 15, which may, for example, be formed of platinum black. Electrical leads 16 and 17 are in contact with the porous conductor and when electrically connected provide for the cell output in a known manner.

FIG. 2 is directed to a schematic cell configuration employing the fluorides of arsenic and cerium and only contains one chamber for the containment of the arsenic fluorides, which are gases at the temperature of operation, whereas the cerium compounrds are solid materials at such temperatures. A container 18 is provided which in this case and in FIGURE 1, may be fabricated of nickel alloys. A chamber 19 is formed for containing both the arsenic trichloride and arsenic pentachloride, which again acts as an anode at 300° K. and as a cathode at 1000° K. The solid electrolyte, as for example, lead difluoride with modest amounts of potassium fluoride to improve the ionic conductivity, is indicated by the numeral 20. On the side of the electrolyte 20 opposite to chamber 19, is deposited cerium trifluoride or cerium pentafluoride, indicated generally by the numeral 21. Such acts as the cathode of the system at 300° K. and as the anode at 1000° K. Electrical leads 22 and 23 complete the cell system.

The graph comprising FIG. 3 illustrates the electrical outputs of the present cells.

It will be understood that various modifications and variations may be effected without departing from the spirit or scope of the novel concepts of my invention.

I claim as my invention:

1. A thermally regenerative galvanic cell comprising as the anode arsenic trifluoride, as the cathode a material selected from the group consisting of cerium pentafluoride and uranium hexafluoride, and an electrolyte.

2. The thermally regenerative galvanic cell as defined in claim 1 wherein the electrolyte consists of lead fluoride.

3. A thermally regenerative galvanic cell comprising as the cathode arsenic pentafluoride, as the anode a material selected from the group consisting of cerium trifluoride and uranium pentafluoride, and an electrolyte.

4. The thermally regenerative galvanic cell as defined in claim 3 wherein the electrolyte consists of lead fluoride.

References Cited by the Examiner
UNITED STATES PATENTS

| | | | |
|---|---|---|---|
| 2,890,259 | 6/1959 | Weininger | 136—86 |
| 2,997,518 | 8/1961 | Klopp et al. | 136—90 |
| 3,088,990 | 5/1963 | Rightmire et al. | 136—86 |
| 3,119,723 | 1/1964 | Crouthamel et al. | 136—86 |
| 3,189,485 | 6/1965 | Panzer | 136—120 X |

WINSTON A. DOUGLAS, *Primary Examiner.*

A. M. BEKELMAN, *Assistant Examiner.*